March 13, 1962 L. O. REICHELT ET AL 3,024,588
CABLE-DISTRIBUTING MECHANISM FOR CABLE-STRANDING APPARATUS
Filed July 10, 1959 7 Sheets-Sheet 1
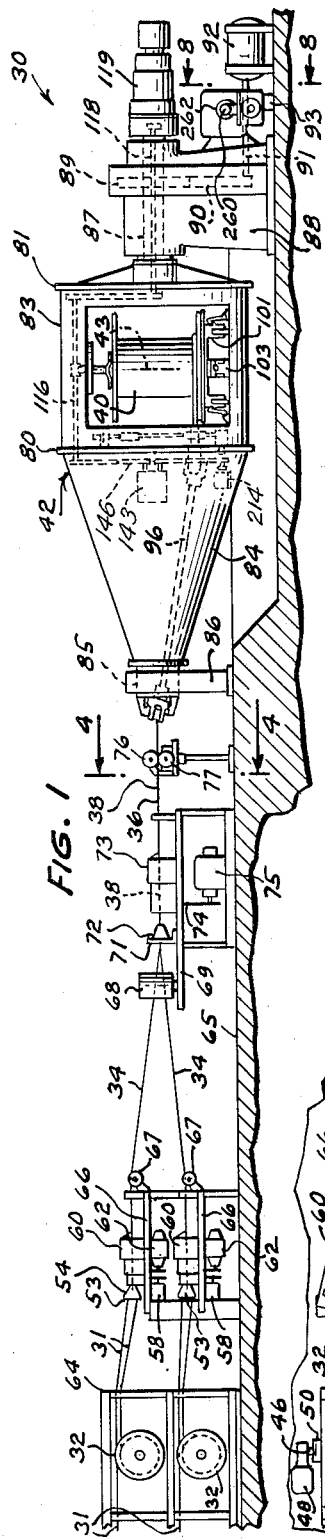
INVENTORS
L. O. REICHELT
D. V. WATERS
BY
A. C. Schwarz, Jr.
ATTORNEY INVENTORS
L.O. REICHELT
D.V. WATERS
BY
A.C. Schwarz, Jr.
ATTORNEY March 13, 1962   L. O. REICHELT ET AL   3,024,588
CABLE-DISTRIBUTING MECHANISM FOR CABLE-STRANDING APPARATUS
Filed July 10, 1959   7 Sheets-Sheet 3
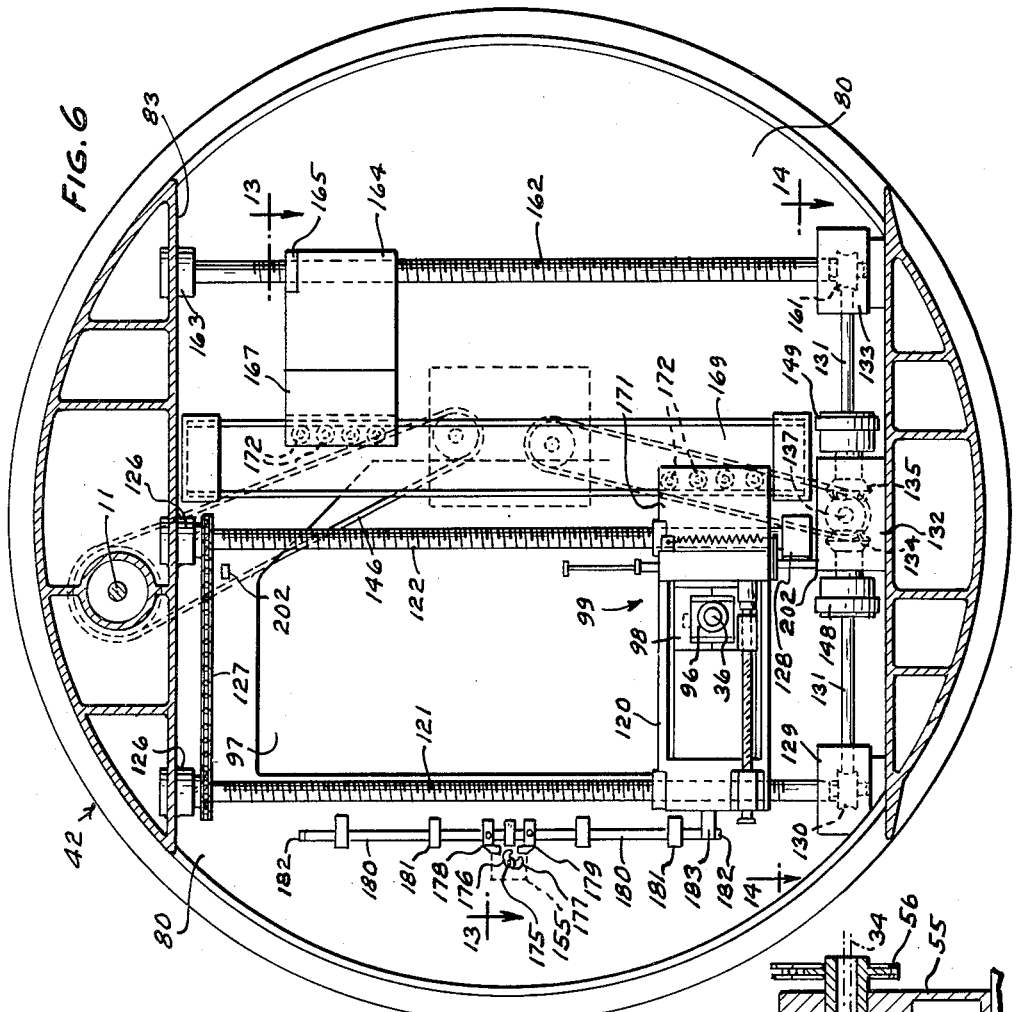
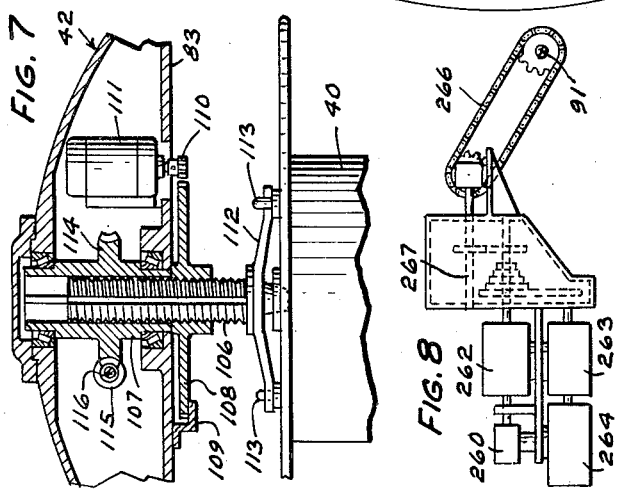
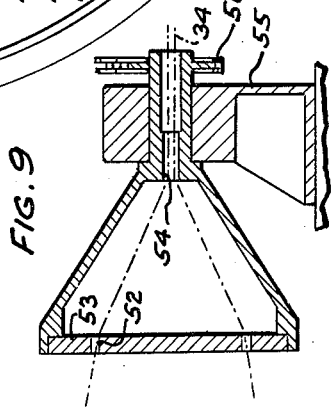
INVENTORS
L. O. REICHELT
D. V. WATERS
BY
A. C. Schwarz, Jr.
ATTORNEY

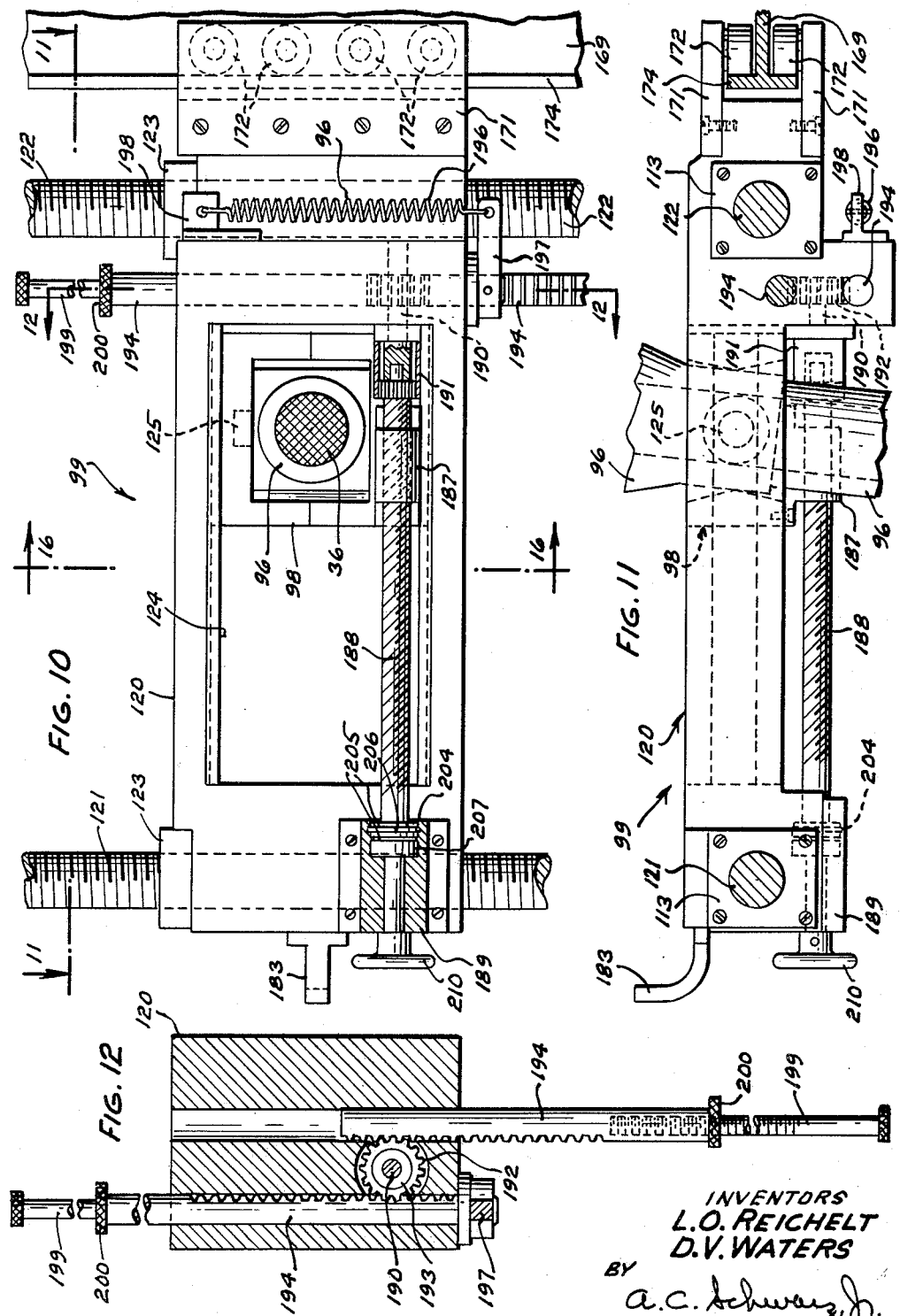

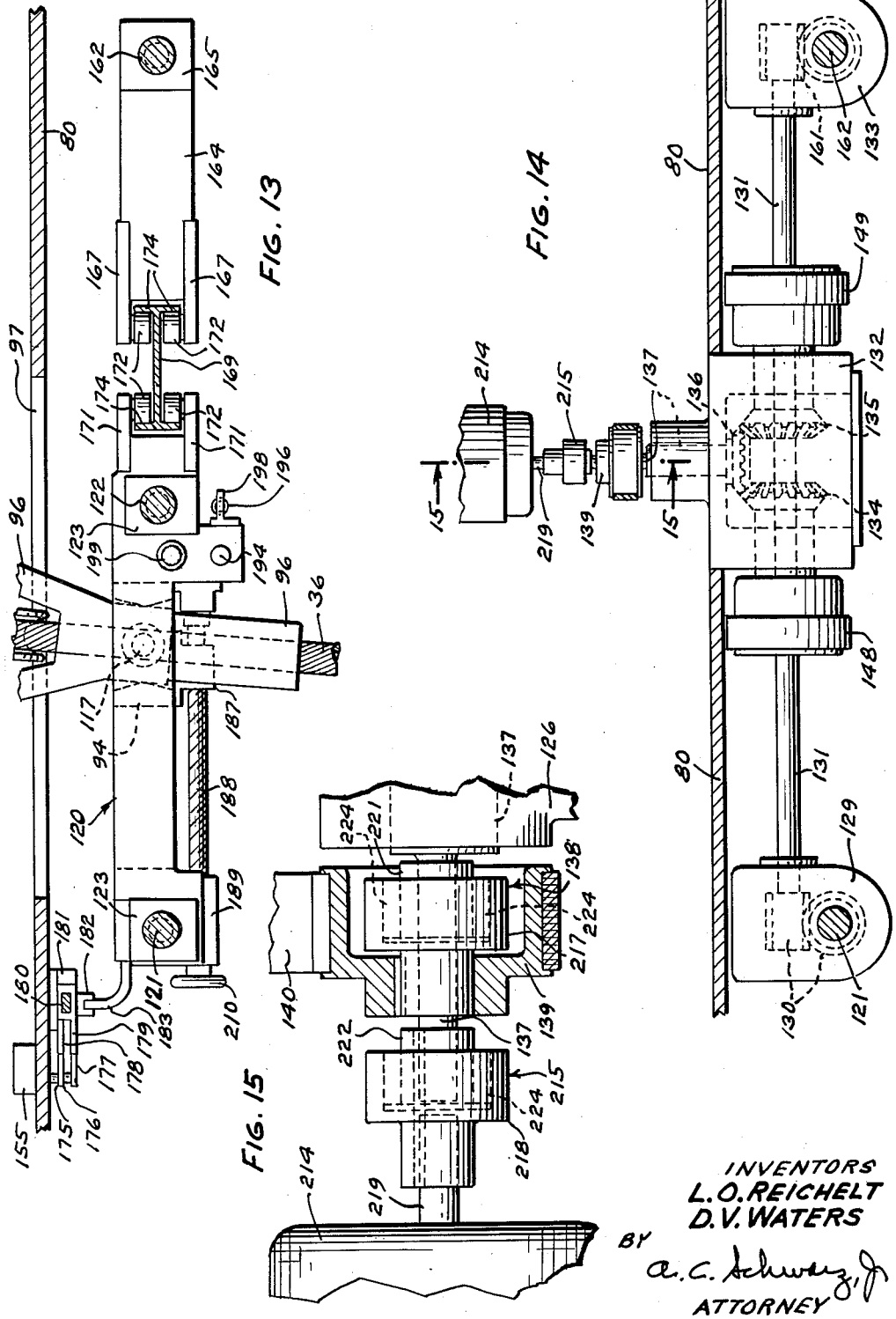

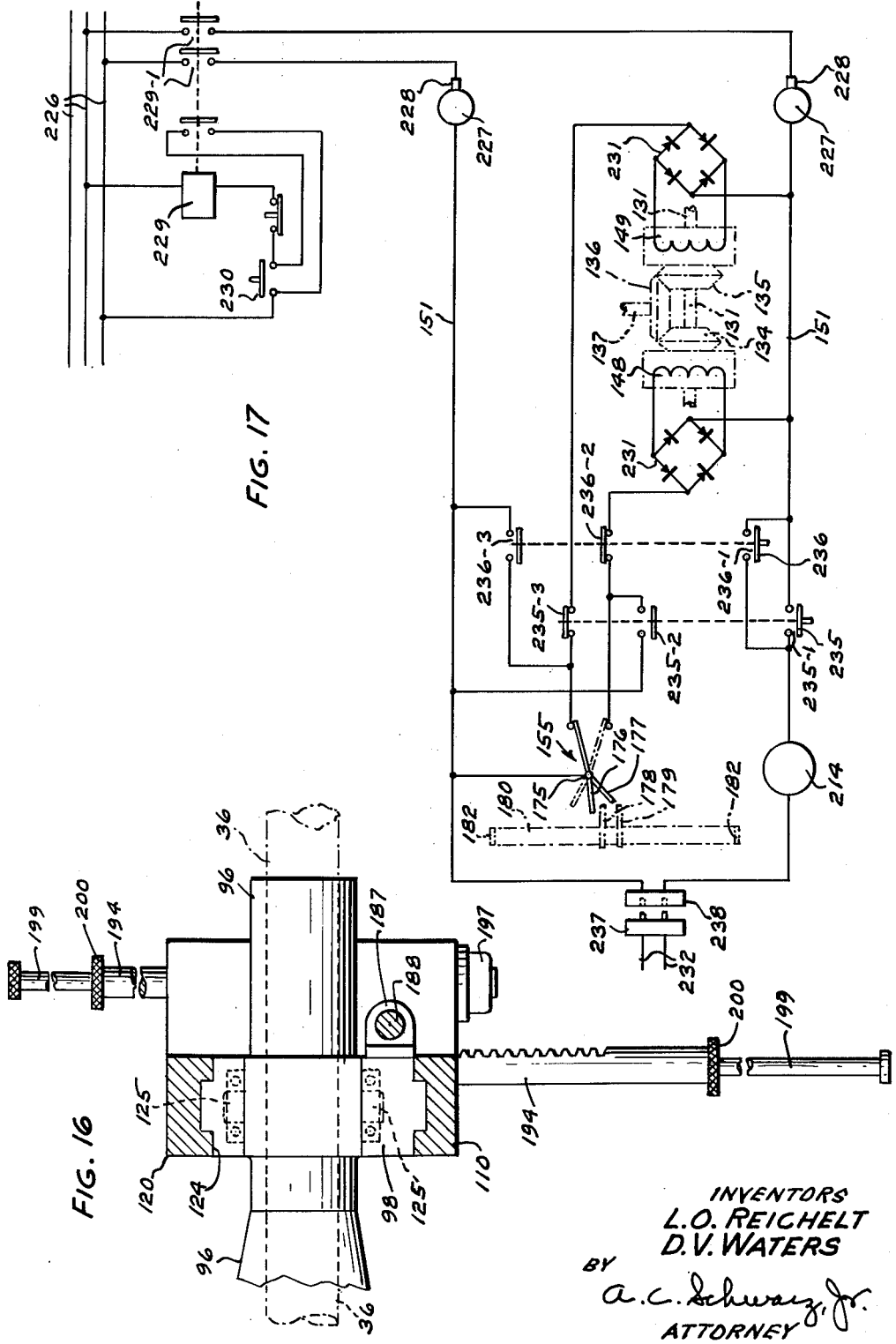

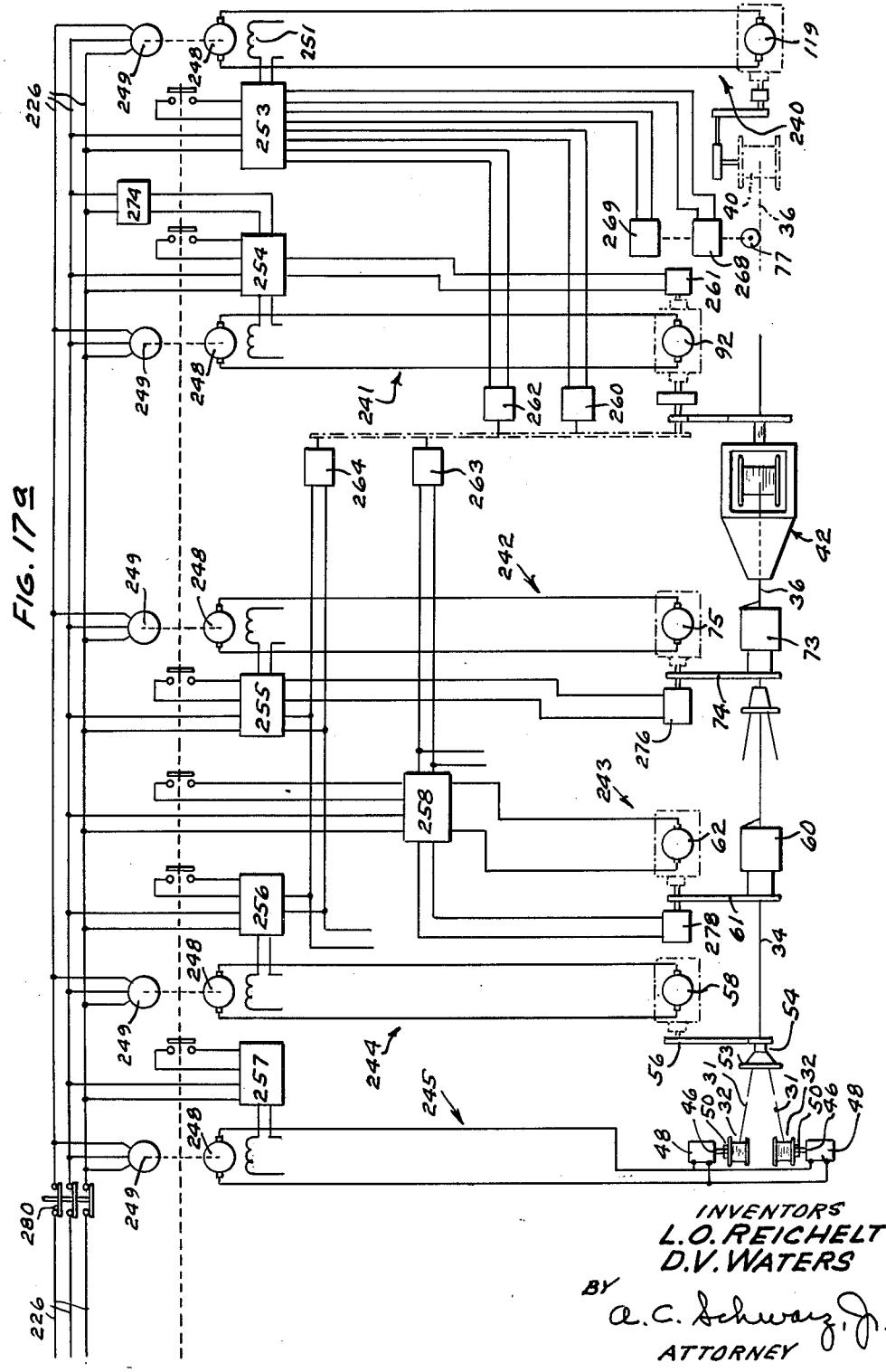

United States Patent Office 3,024,588
Patented Mar. 13, 1962

3,024,588
CABLE-DISTRIBUTING MECHANISM FOR CABLE-STRANDING APPARATUS
Lester O. Reichelt, Downers Grove, Ill., and Daniel V. Waters, Lebanon, N.J., assignors, by direct and mesne assignments, to Western Electric Company, Incorporated, New York, N.Y., a corporation of New York
Filed July 10, 1959, Ser. No. 826,153
10 Claims. (Cl. 57—66.5)

This invention relates to cable-distributing mechanism for cable-stranding apparatus and more particularly to mechanism on a rotatable cradle of a cable-stranding apparatus for distributing cable evenly onto a cable take-up reel on the cradle.

An object of the invention is to provide an improved cable-distributing mechanism for cable-stranding apparatus.

Another object of the invention is the provision of a cable-distributing carriage on a rotary cradle of the cable-stranding apparatus and of mechanism for counterbalancing the carriage.

A further object of the invention resides in means on the cradle for guiding the cable-distributing carriage and a counterweight therefor along parallel paths and for restraining the carriage and the counterweight against displacement laterally of said paths.

A further object of the invention is to provide an auxiliary drive means for moving the distributor carriage on the cradle to a starting point at one end of its traverse preparatory to the winding of a cable onto the cable reel.

Another object of the invention is the provision of a cable-distributing member mounted on the carriage for slidable movement transversely of the traverse of the carriage, and of means for actuating the cable-distributing member one step at the end of each traverse of the carriage for guiding the cable tangentially onto the reel and onto successive layers of the cable as they are formed on the reel.

Another object of the invention is the provision of means for resetting the cable-distributing member to its starting position on the distributor carriage preparatory to the winding of the cable onto the reel.

Mechanism illustrating certain aspects of the invention as applied to a cable-stranding apparatus may include a cable take-up reel and a cradle rotatable about a substantially horizontal axis for supporting the reel with its axis disposed at right angles to the horizontal axis. A main drive imparts rotation to the reel to wind the cable thereonto to advance the cable and a cradle drive rotates the cradle to twist the cable. A plurality of traversing screws on the cradle actuated by the main drive reciprocates a cable-distributing carriage through a predetermined traverse along a path parallel to the axis of the reel for distributing the cable onto the reel and also reciprocates a counterweight parallel and in opposite direction to the movement of the carriage for counterbalancing the carriage. The carriage and the counterweight are disposed on opposite sides of the horizontal axis and of a restraining member rigidly secured to the rotatable cradle and are slidably connected to the restraining member for reciprocation along their normal paths and the carriage and the counterweight are restrained by the member against movement transversely of said paths to overcome the centrifugal force acting thereon.

An auxiliary drive means is provided which is capable of being operated when the cradle is stationary to move the distributor carriage to a starting position at one end of its traverse preparatory to the winding of a cable onto the reel. A cable-distributing member is mounted for sliding movement on the carriage laterally of the traverse of the carriage and means are provided for actuating the distributor member one step at the end of each traverse of the carriage which coincides with the ends of successive layers of the cable on the reel to guide the cable from one layer thereof onto the next. Means are also provided for resetting the cable-distributor member to its inner starting position on the distributor carriage on completion of the cable-winding operation.

Other objects and advantages of the invention will become apparent by reference to the following detailed description thereof and the accompanying drawings, in which:

FIGS. 1 and 2 are fragmentary side and plan views, respectively, of the cable-stranding apparatus embodying the present invention;

FIG. 3 is an enlarged fragmentary view of the cable formed on the present apparatus;

FIG. 4 is a cross-sectional view taken on line 4—4 of FIG. 1 showing signal-generating devices actuated by the cable;

FIG. 6 is a fragmentary cross-sectional view of the apparatus taken along line 6—6 of FIG. 5;

FIG. 7 is a fragmentary cross-sectional view of the apparatus taken along line 7—7 of FIG. 5;

FIG. 8 is a fragmentary cross-sectional view of the apparatus taken along the line 8—8 of FIG. 1 showing signal-generating devices driven from the cradle drive;

FIG. 9 is a fragmentary vertical longitudinal sectional view through an oscillatable face plate and closing die;

FIG. 10 is an enlarged fragmentary elevational view of the cable-distributing mechanism shown in FIG. 6 with portions thereof in section;

FIG. 11 is a fragmentary plan sectional view through the cable-distributing mechanism taken along line 11—11 of FIG. 10;

FIG. 12 is a vertical cross-sectional view through the cable-distributing mechanism taken along line 12—12 of FIG. 10;

Figure 5:
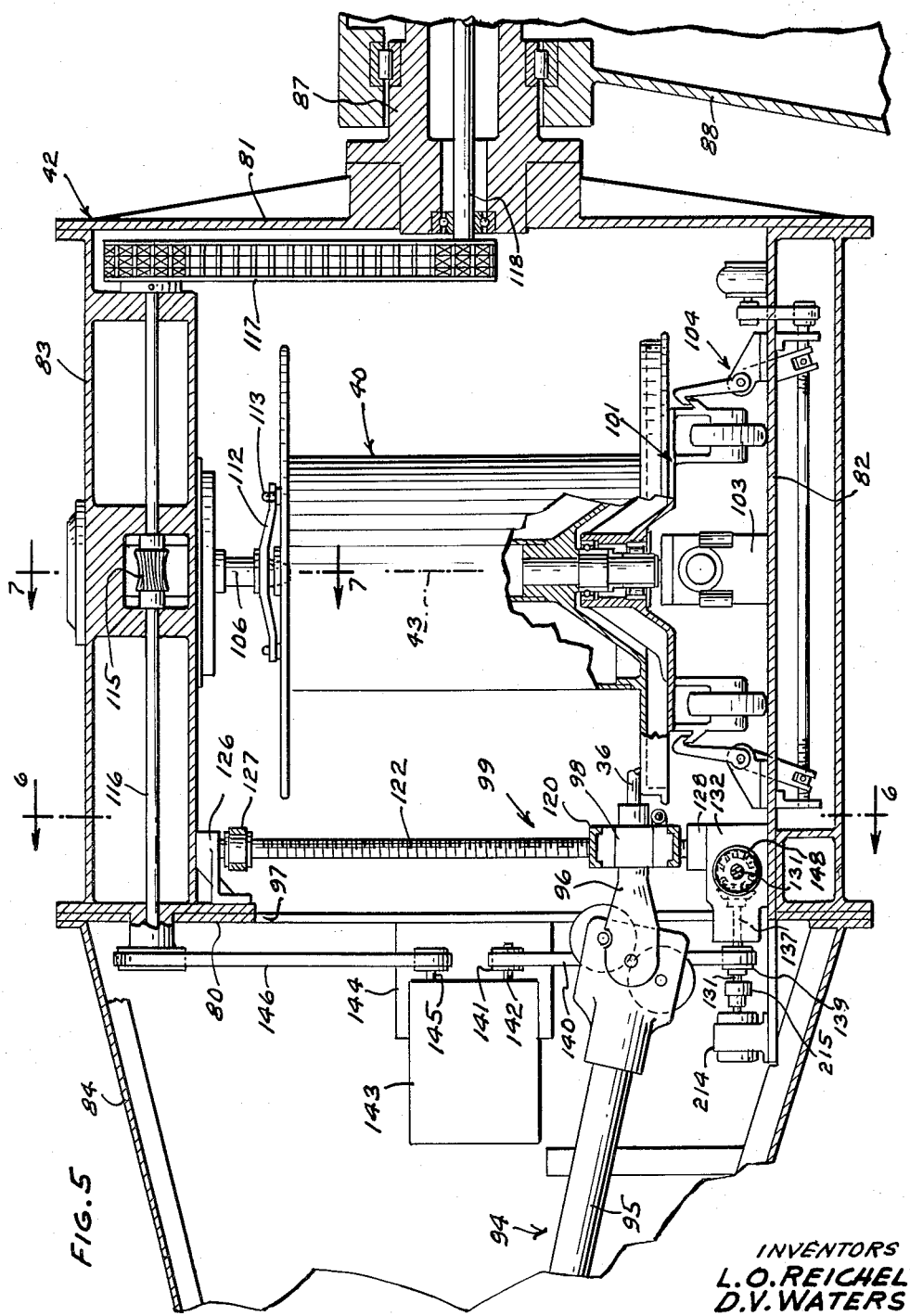
FIG. 5 is an enlarged vertical longitudinal cross-sectional view of the apparatus taken along line 5—5 of FIG. 2.

FIGS. 13 and 14 are enlarged fragmentary plan sectional views of the cable-distributing mechanism taken along lines 13—13 and 14—14 of FIG. 6;

FIG. 15 is a fragmentary vertical sectional elevational view of the cable-distributing mechanism taken along line 15—15 of FIG. 14 and showing the connection of the auxiliary drive thereto;

FIG. 16 is a vertical sectional view through the cable-distributing mechanism taken along line 16—16 of FIG. 10; and FIGS. 17 and 17a comprise a diagrammatic view of the drive for the various components of the cable-stranding apparatus and the electrical control therefor.

Referring to FIGS. 1-3, the present cable-stranding apparatus 30 pulls a plurality of individual strands 31 in in the form of insulated conductors in the same general direction from supplies 32 thereof, arranges the advancing strands 31 into a plurality of cable units 34, wraps binder strands 35 individually around the cable units 34, guides the cable units 34 laterally into engagement with each other to form a cable 36, guides the cable 36 along a substantially horizontal axis 38, and wraps a binder strand 39 around the cable. The leading end of the cable 36 is secured to a take-up reel 40 which is mounted on a cradle 42 of the apparatus 30 with the reel axis 43 at right angles to the horizontal axis 38. The reel 40 is rotated about its axis to advance the cable 36 and the strands 31 at a substantially constant speed and the reel is turned with the cradle 42 about the horizontal axis 38 to impart a twist to the cable 36 to arrange the cable units 34 in a helical pattern.

The strand supplies 32 are carried on spools removably mounted on spindles 46 which are suitably supported and are driven by motors 48 tending to unwind the strand and which spindles are mechanically retarded by automatically adjustable brake means 50 of the type shown in Patent 2,219,196 to apply a predetermined tension to the strands as they are unwound from the spools. The strands 31 are advanced through a plurality of apertures 52 in oscillatable face plates 53 (FIG. 9) and through closing dies 54 associated therewith which arrange groups of the strands 31 into the cable units 34. The face plates 53 and the closing dies 54 are mounted for oscillatory movement in suitable supporting members 55 and are actuated through chain and sprocket connections 56 (FIG. 17a) by driving mechanism including reversible motors 58 for effecting the oscillation of the face plates 53 and the twisting of the strands 31 of the cable units 34 through a predetermined angular traverse in alternate directions at uniform intervals. Switching means (not shown) are provided in each of the motor drives for automatically reversing the motors 58. Adjacent the closing dies 54 are binder mechanisms 60 which wrap the binding strands 35 around the cable units 34 and which are rotated through chain and sprocket connections 61 by motors 62 (FIG. 17a).

As shown in FIGS. 1 and 2, the supplies 32 of strands 31 are arranged in longitudinal rows in vertically and laterally spaced relation to one another and are supported on frames 64 on a base 65. In like manner, the oscillatable face plates 53 and closing dies 54, and the binding mechanisms 60 are supported on frames 66 in vertical and laterally spaced relation to one another for receiving the strands 31. The cable units 34 are guided from the binder mechanisms 60 by suitable means including rollers 67 on the frame 66 and rollers 68 on a frame 69, into apertures in a stationary face plate 71 and through a closing die 72 which face plate and closing die are mounted on the frame 69 and guide the cable units 34 laterally into engagement with each other to form the cable 36 and support it for movement along the horizontal axis 38. Adjacent the stationary closing die 72 is a cable-binder mechanism 73 through which the advancing cable 36 passes and which wraps the binder strand 39 around the cable to secure the cable units 34 in assembled relation to each other. The binder mechanism 73 is driven through a chain sprocket connection 74 by a drive motor 75. As the bound cable 36 advances along the horizontal axis 38, it engages and rotates a pair of tracking wheels 76 and 77 and enters one end of the cradle 42.

The cradle 42, as previously stated, is rotatable about the horizontal axis 38 and comprises a pair of vertically disposed horizontally spaced circular walls 80 and 81 with a horizontal hollow lower platform 82 and a horizontal hollow upper frame member 83 extending between the walls in vertically spaced relation to each other for receiving the reel 40 therebetween and providing a pair of side openings for movement of the reel onto and from the cradle. A tapering end portion 84 of the cradle extends from the wall 80 and has a hollow journal 85 secured thereto which is rotatably supported in a pedestal 86 fixed to the base 65. A hollow journal 87 fixedly secured to the circular wall 81 at the other end of the cradle 42 is journaled in a pedestal 88 and has a gear 89 fixed thereto. This gear is part of a gear train 90 one gear of which is secured to a drive shaft 91 which is driven by a motor 92 to rotate the cradle 42. A power-actuated brake 93 is provided for stopping the rotation of the drive shaft 91 and the cradle 42. The base 65 has a pit formed therein to provide clearance for a portion of the cradle 42 and the base has an upper surface level with the platform 82 of the cradle to facilitate the loading and unloading of the reel 40 onto and from the cradle 42.

As the cable 36 moves into the cradle 42, it enters a composite movable guide tube 94 comprising a pair of articulated tubular sections 95 and 96, the section 95 being swivelly connected at one end to the hollow journal 85 and the tubular section 96 extending through an opening 97 in the cradle wall 80 and being pivotally connected to a distributing member 98 (FIG. 6) of a cable-distributing mechanism 99 for guiding the cable evenly onto the reel 40 in successive layers.

The reel 40 (FIG. 5) is rotatably and permanently mounted on a truck 101 which supports the reel 40 when it is removed from the cradle 42 and which cooperates with the reel to form a reel and reel-truck unit. When the reel and reel-truck unit is in the cradle 42, it is supported in a positioning block 103 fixed to the platform 82 of the cradle 42, and the reel truck 101 is adapted to be clamped to the platform of the cradle by a reel-truck clamping mechanism 104. The upper end of the reel 40 (FIGS. 5 and 7) has a socket for receiving the end of a reel centering and clamping shaft 106 which is rotatably mounted on the upper hollow horizontal frame member 83 of the cradle 42 and is movable axially into engagement with the reel 40 to clamp it against the supporting block 103 and to support the upper end of the reel for rotation.

The shaft 106 is splined to a sleeve 107 for rotation therewith and for axial movement relative thereto and this sleeve is mounted in the hollow upper frame member 83 of the cradle for rotation and against axial movement. Movement is imparted in an axial direction to the shaft 106 by a gear 108, the hub of which forms a nut having internal threads engageable with external threads on the shaft 106. The gear 108 is held against axial movement by the end of the sleeve 107 and by a retaining member 109 secured to the frame member 83, and the gear 108 is adapted to be rotated by a driving pinion 110 on a motor 111. This motor is reversible, and has a normal position with the driving pinion 110 disengaged from the gear 108, and the motor 111 is adapted to be moved into an operative position with the gears 108 and 110 in engagement with each other and to be selectively actuated to rotate the gear 108 and effect movement of the clamping shaft 106 axially in either direction as disclosed in copending application Serial No. 826,224, filed July 10, 1959, now Patent No. 2,987,870. When the shaft 106 is in extended position in clamping engagement with the reel 40 as shown in FIG. 7, a driving engagement between the shaft and the reel is effected by a cross arm 112 on the shaft 106 which arm has notched ends for receiving driving pins 113 on the reel 40.

Rotation of the reel is obtained by a drive mechanism including a worm wheel 114 (FIG. 7) fixed to the sleeve 107 and meshing with a worm 115 on a horizontal shaft 116 which is rotatably supported in the upper hollow frame member 83 of the cradle 42. The shaft 116 is connected through a sprocket and chain connection 117 to a drive shaft 118 which is rotatably supported in the hollow journal 87 and is connected to a reel-drive motor 119, the housing of which motor is secured to the hollow journal 87 for rotation with the cradle 42.

As shown in more detail in FIGS. 6, 10–16, the distributing mechanism 99 for guiding the cable 36 onto the reel 40 in a plane substantially tangent to the cable-supporting surface thereof includes a carriage 120. This carriage is apertured at opposite ends to receive traversing screws 121 and 122 to which the carriage is connected by nuts 123 for reciprocable movement along a path parallel to the axis 43 of the reel 40. The distributing member 98 is reciprocably mounted on the carriage in a slideway 124 for movement perpendicular to the traversing screws 121, 122 and to the horizontal axis 38 of the cradle 42.

The tubular section 96 of the composite cable-guide tube 94 as previously stated is carried by and extends through the distributing member 98 for guiding the cable 36 onto the take-up reel 40 and has a pair of vertically disposed trunnions 125 (FIGS. 10, 11 and 16) journaled in bearing apertures in the distributing member 98 by means of which the tubular section 96 is supported on the distributing member 98 for oscillatable movement about an axis parallel to the reel axis 43. The other end of the composite cable-guide tube 94 is supported on suitable means on the hollow journal 85 for universal movement about a point on the horizontal axis 38, and the composite cable-guide tube is movable with the distributing member 98 in a plane passing through the axis of the trunnions 125 on the distributing member and the point of universal movement on the horizontal axis 38 as more clearly disclosed in co-pending application Serial No. 826,225, filed July 10, 1959, now Patent No. 2,977,747.

The traversing screws 121 and 122 are mounted at their upper ends in bearings 126 (FIG. 6) in the upper frame member 83 of the cradle 43 and are interconnected for simultaneous rotation by a sprocket and chain connection 127. The lower end of the traversing screw 122 is rotatably supported in a bearing 128 mounted on the vertical wall 80 of the cradle 42 and the lower end of the traversing screw 121 is journaled in a gear box 129 supported on the platform 82 of the cradle.

Through worm-reduction gearing 130 (FIGS. 6 and 14), the traversing screw 121 is connected to a reversible drive shaft 131 which is rotatably supported in the gear box 129, and gear boxes 132 and 133 on the platform 82. Bevel gears 134 and 135 in the gear box 132 are rotatably mounted on the shaft 131 and mesh with a bevel gear 136 fixed to a stub drive shaft 137 also supported in the gear box 132. The drive shaft 137 is connected through a one-way clutch 138 (FIG. 15) to the hub of a sprocket 139 which in turn is connected by a chain 140 and a sprocket 141 (FIGS. 5 and 6) to an output shaft 142 of a change-speed gear mechanism 143. This change-speed gear mechanism is supported by suitable means including a bracket 144 (FIG. 5) on the vertical wall 80 of the cradle 42. An input shaft 145 of the change-speed mechanism 143 is connected through a sprocket and chain connection 146 to the reel-drive shaft 116. The change-speed gear mechanism is selectively adjustable to rotate the output shaft 142 at various speeds relative to the input shaft 145 in accordance with the size of the cable being formed.

The pair of bevel gears 134, 135 are selectively connectible to the shaft 131 by means of electromagnetic clutches 148 and 149 (FIGS. 14 and 17) which are alternately connected to power lines 151 and energized under control of a reversing switch 155 to effect the reversal of rotation of the shaft 131 and the reversal of movement of the carriage 120.

As viewed in FIGS. 6 and 14, the right-hand end of the reversible drive shaft 131 is rotatably supported in the gear box 133 and is operatively connected through worm gearing 161 to a traversing screw 162 which is supported at its upper end in a bearing 163 in parallel relation to the traversing screws 121, 122. The traversing screw 162 extends through a bore in a counterweight 164 and is operatively connected to the counterweight by a nut 165 secured thereto. At its other end, the counterweight 164 has a pair of plates 167 secured thereto which straddle a vertical frame member in the form of an I-beam 169 (FIGS. 6 and 13). The I-beam is anchored at its ends to the cradle 42 and cooperates with the traversing screw 162 to guide the counterweight in a predetermined carriage 120. The counterweight 164 and the cable-distributor carriage are moved in opposite directions to counterbalance each other in all positions to render the cradle 42 dynamically balanced during the cable-stranding operation.

As the counterweight 164 and distributor carriage 120 move along the intermediate portions of their respective paths of movement and pass each other during the rotation of the cradle 42, the centrifugal force of the counterweight 164 and of the distributing carriage 120 is sufficient to cause them to move radially outwardly and bend the traversing screws 121, 122 and 162 if they are not restrained therefrom. To prevent such damage to the traversing screws, a pair of plates 171, similar to plates 167 on the counterweight 164, are secured to one end of the carriage 120 and straddle a portion of I-beam 169. Rows of rollers 172 are mounted on the plates 171 and 167 in engagement with the flanges 174 as shown in FIGS. 6 and 13 and cooperate therewith to prevent lateral movement of the carriage 120 and the counterweight 164 while permitting free longitudinal movement thereof.

The reversing switch 155 (FIGS. 6, 13 and 17) for the electromagnetic clutches 148, 149 is mounted on the cradle wall 80 and is connected to a rod 175 having a pair of fingers 176 and 177 mounted thereon for cooperation with a pair of cams 178 and 179, respectively, adjustably secured to an actuating bar 180. This actuating bar is slidably mounted in brackets 181 on the cradle wall 80 and has laterally bent ends 182 positioned in the path of travel of a tripping member 183 extending from one end of the distributor carriage 120 (FIGS. 6, 10 and 11). The parts are so arranged that the tripping member 183 engages the ends 182 of the actuating bar 180 and moves the bar in opposite directions at the end of successive traversing movements of the distributor carriage 120 to reverse the switch 155 and effect the reversal of rotation of the drive shaft 131 and the direction of travel of the carriage 120 and the counterweight 164.

Mechanism is provided which is operable during the winding of the cable 36 onto the reel 40 for stepping the distributor member 98 laterally on the carriage 120 on completion of the winding of a layer of cable 36 onto the reel 40 and in response to the movement of the distributor carriage 120 to the end of its traverse in opposite directions. The distributor member 98 (FIGS. 10, 11 and 16) has a nut 187 fixed thereto which rides on a lead screw 188 journaled at one end in a bearing 189 on the carriage 120. At its other end, the lead screw 188 is releasably connected to a shaft 190 through a splined clutch sleeve 191 telescopingly engaging splined end portions of the lead screw 188 and the shaft 190. This shaft 190, journaled in bearings on the distributor carriage 120, has a gear 192 rotatably mounted thereon and connectible thereto by a conventional one-way roller clutch 193 (FIG. 12) for effecting a driving engagement between the gear 192 and the shaft 190 in response to rotation of the gear in one direction.

The gear 192 meshes with a pair of racks 194, 194 which are slidably mounted in guide apertures in the distributor carriage 120 on opposite sides of the gear 192. A spring 196 (FIG. 10) is connected at one end to a laterally projecting arm 197 on one end of one of the racks 194 and is connected at its other end to a lug 198 on the carriage 120 to move the racks 194 to normal extended positions with portions thereof projecting from the carriage 120 in opposite directions as shown in FIGS. 12 and 16. The engagement of the arm 197 with the carriage 120 limits the outward movement of the racks 194. Adjustable extension rods 199 are threadedly mounted on the racks 194 and are locked in adjusted position by lock nuts 200.

As the carriage 120 approaches the end of its traverse in either direction, the end of one of the extension rods 199 will engage one of a pair of stops 202 (FIG. 6) fixedly mounted on the cradle 42, and the rack 194 associated therewith will be stopped thereby while the carriage 120 continues advancing to the end of its traverse during the winding of the last turn of cable 36 in each layer of cable, thereby causing the gear 192 and the lead screw 188 to be rotated by the rack 194 through a predetermined angular distance. This effects the lateral movement of the distributor member 98 and the cable-guide tube 94 through one step to guide the cable 36 onto the preceding layer of cable.

Because the outward stepping movement of the distributor member 98 must be completed within the time of winding an end turn of the cable 36 on the cable take-up reel 40, a long pitch lead screw 188 is used. The lead screw 188 is therefore not self-locking and under the effect of centrifugal force, the distributor member 98 would travel thereon to its outermost position on the carriage 120. To prevent the free rotation of the lead screw 188 and the movement of the distributor member 98 to its outermost position, a friction clutch 204 (FIGS. 10 and 11) is provided which comprises discs 205 splined to the screw 188 and a cooperating disc 206 splined to the bearing 189 on the carriage 120. An anti-friction thrust bearing 207 is mounted in the bearing 189 for receiving the thrust of the lead screw 188 and the distributor member 98.

When a predetermined length of the cable 36 has been wound onto the take-up reel 40 and the cable-stranding appartus has been stopped, the cable severed, and the loaded reel 40 removed from the cradle 42, the distributor member 98 is returned to its innermost position on the carriage 120 preparatory to winding a new length of cable onto the cable reel, by first manually moving the splined coupling sleeve 191 axially to disconnect the lead screw screw 188 from the shaft 190, and then rotating the lead screw 188 by means of a hand wheel 210 secured to the end thereof.

To start a new length of cable 36 onto an empty cable reel 40, it is necessary to return the distributor carriage 120 to its bottom or zero position and for this purpose, an auxiliary drive is provided having a motor 214 (FIGS. 5, 14 and 15). This motor is suitably supported on the tapering end portion 84 of the cradle 42 and is connected through a one-way clutch 215 to the drive shaft 137 of the cable-distributing mechanism 99 for rotating the shaft 137 in one direction.

As shown particularly in FIG. 15, the one-way clutches 138 and 215 are similar in construction and have outer driving elements 217 and 218 fixed to the driving sprocket 139 and the motor shaft 219, respectively, and have driven elements 221 and 222, respectively, fixed to the drive shaft 137. Connector elements 224 cooperate with the driving elements and the driven elements of the clutches 138 and 215 to establish driving connections between the driving and the driven elements only when the driving elements are rotated in one direction. These one-way clutches are so arranged that when the auxiliary drive motor 214 is rotating to drive the shaft 137, the one-way clutch 138 overruns and disconnects the sprocket 139 and the main or reel drive from the drive shaft 137, and conversely, when appartus 30 is operating and the reel drive operates to rotate the drive shaft 137, the one-way clutch 215 overruns and disconnects the auxiliary drive motor 214 from the drive shaft 137.

Referring to FIG. 17, the magnetic clutches 148 and 149 and the reversing switch 155 are connected across the power lines 151, 151 which are carried internally on the cradle 42 and are connected to an external power source 226 through slip rings 227, 227 rotatable with the motor 119, stationary brushes 228, 228 suitably mounted externally of the cradle 42, and contacts 229–1, 229–1 of a relay 229. The relay 229 is connected to the power source 226 under control of a start push button 230. Rectifiers 231 are provided for rectifying the current to the magnetic clutches 148 and 149. During the operation of the cable-stranding apparatus 30, the magnetic clutches 148 and 149 are alternately energized under control of the switch 155 as previously described.

When the cable-winding operation has been completed and the apparatus stopped, the relay 229 is deenergized and the power lines 151, 151 are electrically disconnected from the power source 226. An auxiliary external power source 232 and manually-operated control switches 235 and 236 are provided for operating the auxiliary drive motor 214 and the magnetic clutches 148 and 149. This power source 232 is connected externally of the cradle to a power plug 237 which is adapted to be inserted into a socket 238 mounted on the cradle 42 and connected to the lines 151, 151.

The switch 235 is stressed to a normal open position as shown in FIG. 17 and has normally open contacts 235–1, 235–2 and normally closed contacts 235–3 and when this switch is manually actuated, it serves to energize the auxiliary drive motor 214 and the magnetic clutch 148 to effect the movement of the distributing carriage 120 in one direction. In like manner, the switch 236 is stressed to a normal open position and has normally open contacts 236–1, 236–3 and normally closed contacts 236–2 and in response to manual actuation of this switch, the magnetic clutch 149 is energized and the auxiliary drive motor 214 is rendered effective to move the distributing carriage 120 in the opposite direction. With this arrangement the auxiliary drive motor 214 and the magnetic clutches may be selectively actuated to effect the movement of the cable-distributing carriage 120 in either direction to a starting position at either end of its traverse.

A system is provided for synchronizing the drives of the several components of the apparatus so as to obtain a uniform twist of the cable units as the cable builds up on the take-up reel and to obtain a uniform lay of the binding strands on the cable and the cable units during the acceleration and deceleration of the apparatus.

The reel-drive motor 119 (FIG. 17a), the cradle-drive motor 92, the cable-binder drive motor 75, the unit-binder drive motors 62 (only one of which is shown), the drive motors 58 (only one of which is shown) for the oscillatory face plates 53, and the drive motors 48 (only two of which are shown) for the strand supplies 32, are variable speed D.C. motors of conventional D.C. variable speed drive systems 240–245, respectively. In each of the variable speed drive systems 240, 241, 242, 244 and 245, the variable speed motor is electrically connected to and receives a controlled variable current supply from a D.C. generator 248 which is driven from an A.C. motor 249 electrically connected to the power source 226. The resistance of the generator fields 251 of the systems 240, 241, 242, 244 and 245 are varied by electronic control devices 253–257, respectively, which are connected to the power source 226 and are responsive to control voltages fed thereto to adjust and control the speed of the D.C. drive motors 119, 92, 75 and 58, respectively.

In each of the D.C. drive systems 243 for the several binder mechanisms 60, the drive motor 62 is energized and its speed is controlled by an electronic controlling device 258 connected to the power source 226.

The cradle motor 92 is the lead motor of the drive systems of the apparatus and a selsyn generator 260 and tachometer generators 261, 262, 263 and 264 are driven in timed relation thereto and to the cradle 42. As shown in FIG. 8, the selsyn generator 260 and the tachometer generators 262, 263 and 264 are driven from the shaft 91 through a chain and sprocket connection 266 and a change-speed gear mechanism 267 whereby the drive ratio between the cradle 42 on the one hand and the selsyn and these tachometer generators on the other hand may be changed when the apparatus is set up to strand cables of different sizes with different lengths of cable lay. The tachometer generator 261 is connected to one end of the cradle motor 92 and is driven directly thereby.

A selsyn generator 268 and a tachometer generator 269 are driven in timed relation to the movement of the cable 36 by the tracking wheel 77 (FIGS. 1, 4 and 17a) which engages the cable 36 at a point between the cable-binder mechanism 73 and the cradle 42. As shown in FIG. 4, the tracking wheel 77, the selsyn generator 268, and the tachometer generator 269 are connected together and are supported on a standard 271. The upper tracking wheel 76 is adjustably mounted on the standard 271 and serves to press and maintain the cable 36 in engagement with the tracking wheel 77.

A voltage from the cradle-driven tachometer generator 261 is fed to the electronic control device 254 and is compared with a reference voltage fed thereto by a conventional adjustable timed reference voltage supply 274 and the difference between these voltages is utilized by the device 254 to excite the field 251 of the cradle-drive generator 248 and obtain a predetermined substantially constant speed of the cradle motor 92 and the cradle 42.

Reference voltages from the cradle-driven selsyn generator 260 and the tachometer generator 262 are fed into a phase-sensitive rectifier of the electronic control device 253 and compared with feed-back voltages from the cable-driven selsyn generator 268 and tachometer generator 269, respectively, and the voltage difference between the two tachometers and the two selsyn generators is used to control the excitation of the generator field 251 of the drive system 240 and control the speed of the reel-drive motor 119 to advance the cable in timed relation to the rotation of the cradle 42. The combination of the tachometer generator and the selsyn generator control is used in order to have complete control throughout the entire speed range. At very low speeds, the tachometer generator voltages approach zero but at higher speeds, their addition to the circuit insures stability. It will be understood that the reel-drive system 240 and the cable-drive system 241 and the controls therefor operate to vary the rotation of the reel 40 as the cable 36 builds up thereon and serves to advance the cable 36 in substantially fixed relation to the rotation of the cradle 42 to obtain a uniform twist of the cable.

In the drive system 242 for rotating the cable-binder mechanism 73, a feed-back voltage from a tachometer 276 driven by the motor 75 is fed to the electronic control device 255 and compared with a reference voltage from the cradle-driven tachometer generator 264 and the difference between the voltages is utilized by the electronic device 255 to control the speed of the motor 75 and cause the cable-binding mechanism 73 to rotate in a substantially fixed relation to the rotation of the cradle 42 and thus effect a uniform lay of the binding strand 39 on the cable 36.

The reference voltage from the cradle-driven tachometer generator 264 is also fed to each of the electronic control devices 256 of the several drive systems 244 and is utilized by these electronic devices to control the speed of the motors 58 and the oscillation of the face plates 53 in timed relation to the rotation of the cradle 42 to obtain a uniform twist of the strands 31 in the cable units 34.

In a similar manner, the reference voltage from the cradle-driven tachometer generator 263 is fed to each of the electronic control devices 258 of the several drive systems 243 and this reference voltage is compared with a feed-back voltage fed into each of the devices 258 by a tachometer generator 278 driven by the motor 62 of each drive system 243 and the difference between the reference and the feed-back voltages is utilized by the electronic devices 258 to control the speed of the motors 62 and cause the binder mechanism 60 to rotate in substantially fixed relation to the rotation of the cradle 42 to effect a uniform lay of the binding strands 35 on the cable units 34.

From the above description of the variable D.C. drive systems 242, 243 and 244 and the electronic control devices associated therewith, it will be understood that they effect the oscillation of the face plates 53 and the rotation of the unit-binder mechanisms 60 and the cable-binder mechanism 73 in timed relation to the rotation of the cradle 42 to obtain a substantially uniform twist or lay of the strands 31 in the cable units 34 and the substantially uniform lay of the binder strands 35 and 39 on the cable units 34 and the cable 36, respectively, during the operation of the cable-stranding apparatus including the periods of acceleration and deceleration incident to the starting and the stopping of the apparatus.

The motors 48, for rotating the supply spools of strand 31 against the retarding action of the brakes 50, are arranged in groups with a predetermined number in each group and with each group of motors having its own D.C. drive system 245 and electronic control deivces 257. Each of the electronic devices 257 is connected to the power source 226, and when the cable-stranding apparatus 20 is started, each of these electronic devices serve to supply a predetermined maximum current to the motors 48 of its group to force the motors to overcome the inertia inherent in the supply reels during the acceleration of the apparatus from zero speed to normal operating speed. When the components of the apparatus reach normal operating speed, the electronic devices 257 serve to reduce the current to the motors 48 to a proper value for said apparatus operating speed.

Actuation of a switch 280 serves to connect the A.C. motors 249 of the drive systems 240, 241, 242, 244 and 245 and the electronic control devices 253—258 to the power source 226 and actuation of the start button 230 (FIG. 17) serves to start the drive motors 48, 58, 62, 75, 92 and 119.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a cable-stranding apparatus, a cable take-up reel, a cradle for supporting the reel for rotation about its axis, a cable-distributing carriage mounted on said cradle for movement parallel to said axis for guiding the cable onto said reel, means including a drive shaft for reciprocating said carriage through a predetermined traverse, a main drive means including a first motor mounted on said cradle for rotating said reel and for rotating said drive shaft to effect the reciprocation of said carriage in timed relation to the rotation of said reel, an auxiliary drive means including a second motor mounted on said cradle for rotating said drive shaft to effect the movement of said carriage to a starting position at one end of its traverse, a one-way clutch interconnecting said main drive means and said drive shaft for rotation of said drive shaft in one direction, and a one-way clutch interconnecting the auxiliary drive means and said drive shaft for rotation of said drive shaft in said one direction.

2. In an apparatus for stranding cable, a cradle, a reel mounted on said cradle, a carriage mounted on said cradle for reciprocatory movement along a path parallel to the axis of said reel, a distributor member mounted on said carriage for reciprocatory movement therewith and for movement relative thereto transversely of said path for guiding the cable onto said reel, means for rotating said reel, means for reciprocating said carriage in timed relation to the rotation of said reel, a lead screw mounted on the carriage for moving said distributor member transversely of said path, means operable in response to movement of the carriage in opposite directions and through predetermined zones for rotating said lead screw through predetermined angular distances in one direction to effect successive movements of said distributor member, means for disconnecting said lead screw from said last-mentioned means, and means for turning said lead screw in a reverse direction to move said distributor member to a starting position on said carriage.

3. In a cable-stranding apparatus, a cable take-up reel, a cradle for supporting the reel for rotation about its axis, a cable-distributing carriage mounted on said cradle for movement parallel to said axis for guiding the cable onto said reel, means including a drive shaft for reciprocating said carriage through a predetermined traverse, a main drive means including a first motor mounted on said cradle for rotating said reel and for rotating said drive shaft to effect the reciprocation of said carriage in timed relation to the rotation of said reel, an auxiliary drive means including a second motor mounted on said cradle for rotating said drive shaft to effect the movement of said carriage to a starting position at one end of its traverse, a first clutch means interconnecting said main drive means and said drive shaft and rendered effective to rotate said drive shaft in one direction only in response to operation of said main drive means, a second clutch means interconnecting the auxiliary drive means and said drive shaft and rendered effective to rotate said drive shaft in said one direction in response to operation of said auxiliary drive means, and means for selectively operating said main drive means and said auxiliary drive means.

4. In a cable-stranding apparatus, a cable take-up reel, a cradle for supporting the reel for rotation about its axis, a cable-distributing carriage mounted on said cradle for movement parallel to said axis for guiding the cable onto said reel, means including a drive shaft for reciprocating said carriage through a predetermined traverse, a pair of one-way clutches each having a driven element fixed to said drive shaft and having a driving element for rotating said driven element in one direction, a first drive means for rotating said reel and connected to the driving element of one of said clutches for rotating said drive shaft to effect the reciprocation of said carriage in timed relation to said reel, a second drive means connected to the driving element of the other clutch for rotating said drive shaft to effect the movement of said carriage to a starting position, and means for selectively operating said first drive means and said second drive means.

5. In a cable-forming apparatus, a cable take-up reel, a cradle for supporting the reel for rotation about its axis, a cable-distributing carriage mounted on the cradle for reciprocable movement along a path parallel to said axis, drive means for simultaneously rotating the reel and for reciprocating said carriage, a cable-distributing member slidably mounted on the carriage for movement transversely of said path for guiding the cable onto the reel, a lead screw on said carriage for moving the distributing member on said carriage transversely of said path, a gear supported on said carriage, clutch means interconnecting said gear and said lead screw for rotating said lead screw in one direction in response to rotation of said gear in said one direction, a pair of racks slidably mounted on the carriage in engagement with said gear and projecting from the carriage in opposite directions parallel to said path, resilient means for retaining said racks in and returning them to a normal position on said carriage, and means mounted on the cradle in the path of said racks for stopping them at predetermined points in the travel of the carriage to effect the rotation of the lead screw in said one direction and the movement of said cable-distributing member through a predetermined distance.

6. In a cable-forming apparatus, a cable take-up reel, a cradle for supporting the reel for rotation about its axis, a cable-distributing carriage mounted on the cradle for movement along a path parallel to said axis, drive means for simultaneously rotating said reel and reciprocating said carriage, a cable-distributing member slidably mounted on the carriage for movement transversely of said path for guiding the cable onto said reel, a lead screw on said carriage for moving the cable-distributing member transversely of said path, a gear, a one-way clutch interconnecting the gear and the lead screw for rotating the screw in one direction in response to rotation of the gear in said one direction, a pair of racks slidably mounted on the carriage in engagement with said gear and projecting from the carriage in opposite directions parallel to said path, extension rods projecting from the ends of said racks, stop means mounted on said supporting means in the path of the racks and engageable with the extension rods for stopping the racks at predetermined points in the travel of the carriage to effect the rotation of the lead screw in said one direction and the movement of the cable-distributing member on said carriage through a predetermined distance, and means for adjusting the extension rods on the racks to vary the extent of movement of the cable-guide member on the carriage.

7. In a cable-forming apparatus, a cradle, a cable take-up reel supported on the cradle, a cable-distributing carriage mounted on the cradle for movement along a path parallel to the axis of the reel, drive means for rotating the reel and for reciprocating said carriage, a cable-distributing member slidably mounted on the carriage for movement therewith along said path and for movement relative thereto transversely of said path for guiding the cable onto the reel, a lead screw on said carriage for moving said distributing member transversely of said path, a gear, means interconnecting said gear and said lead screw for rotating said screw in one direction in response to rotation of said gear in said one direction, a pair of racks slidably mounted on said carriage in engagement with said gear and projecting from the carriage in opposite directions parallel to said path, resilient means for retaining said racks in a normal position on said carriage, means mounted on the cradle in the path of the racks for stopping them at predetermined points in the travel of the carriage to effect the rotation of the lead screw in said one direction and the movement of said cable-distributing member through a predetermined distance, means for operatively disconnecting the lead screw from the gear to permit rotation of said lead screw in a reverse direction, and means for rotating the lead screw in said reverse direction to effect the movement of said cable-distributing member on said carriage to a starting position adjacent the reel.

8. In a cable-forming apparatus, a cradle, a cable take-up reel supported on said cradle, a cable-distributing carriage mounted on said cradle for movement along a path parallel to the axis of said reel, drive means for simultaneously rotating said reel and reciprocating said carriage, a cable-distributing member slidably mounted on the carriage for movement therewith along said path and for movement relative thereto transversely of said path for guiding the cable onto the reel, a lead screw on said carriage for moving said distributing member transversely of said path, a gear, means interconnecting the gear and the lead screw for rotating the screw in one direction in response to rotation of the gear in said one direction, a pair of racks slidably mounted on the carriage in engagement with said gear and projecting from the carriage in opposite directions parallel to the path of movement of said carriage, resilient means for retaining said racks in normal extended positions on said carriage, means mounted on said cradle in the path of said racks for stopping the racks at predetermined points in the travel of said carriage to effect the rotation of said lead screw in said one direction and the movement of said cable-distributing member through a predetermined traverse, means on said carriage for yieldably retaining said lead screw in positions of rest, means for operatively disconnecting said lead screw from said gear, and means for rotating said lead screw in a reverse direction to effect the movement of said cable-distributing member on said carriage to a predetermined starting position.

9. An apparatus for making cable comprising a cradle, a fixed guide on said cradle for guiding the cable into the cradle along a first axis and for movement from said axis in diverging directions, a reel mounted on said cradle with its axis at right angles to said first axis, a carriage mounted on said cradle for reciprocatory movement through strokes of a predetermined length along a path parallel to the axis of said reel, a distributor member mounted on said carriage for reciprocatory movement therewith and for movement relative thereto transversely of said path for guiding the cable from said fixed guide to said reel, means for rotating the reel to wind the cable thereon, means for reciprocating the carriage in timed relation to the rotation of the reel, a lead screw mounted on the carriage for moving the distributor member transversely of said path, and means on said carriage operable in response to movement of the carriage through the last portion of each stroke for rotating said lead screw through a predetermined angular distance in one direction to effect successive movements of said distributing member.

10. In a cable stranding apparatus having a cradle mounted for rotation about a first axis, a cable take-up reel mounted on said cradle for rotation therewith and with the axis of said reel positioned at right angles to said first axis, a cable distributing carriage, a counterweight, and means for moving said cable distributing carriage and said counterweight in opposite directions along adjacent paths parallel to the axis of said reel and on opposite sides of the first axis, the combination therewith of a straight rigid frame member fixedly mounted on said cradle between said carriage and said counterweight in parallel relation to the paths of movement thereof, and roller means on said carriage and on said counterweight for connecting said carriage and said counterweight individually to said frame member for movement longitudinally of said frame member and against movement laterally thereof.

References Cited in the file of this patent

UNITED STATES PATENTS

| | | |
|---|---|---|
| 1,981,083 | Somerville | Nov. 20, 1934 |
| 2,484,178 | MacCreadie | Oct. 11, 1949 |
| 2,660,382 | Wilson | Nov. 24, 1953 |
| 2,757,883 | Schlang et al. | Aug. 7, 1956 |
| 2,763,979 | Swanson | Sept. 25, 1956 |

UNITED STATES PATENT OFFICE
CERTIFICATE OF CORRECTION

Patent No. 3,024,588 March 13, 1962

Lester O. Reichelt et al.

It is hereby certified that error appears in the above numbered patent requiring correction and that the said Letters Patent should read as corrected below.

Column 2, line 55, strike out "in"; column 5, line 63, before "carriage" insert -- path parallel to the movement of the cable-distributor --; column 7, line 22, strike out "screw", first occurrence; same column, line 48, for "appartus" read -- apparatus --.

Signed and sealed this 18th day of September 1962.

(SEAL)
Attest:

ERNEST W. SWIDER
Attesting Officer

DAVID L. LADD
Commissioner of Patent